United States Patent
Xiao et al.

(10) Patent No.: US 11,700,149 B1
(45) Date of Patent: Jul. 11, 2023

(54) AUTOMATIC RSVP TUNNEL ENDPOINT ALIASING

(71) Applicant: Arista Networks, Inc., Santa Clara, CA (US)

(72) Inventors: Zhenhua Xiao, Port Moody (CA); Kalash Chandra Nainwal, Surrey (CA); Martin Stigge, Uppsala (SE)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 17/566,939

(22) Filed: Dec. 31, 2021

(51) Int. Cl.
*G06F 15/16* (2006.01)
*H04L 12/46* (2006.01)
*H04L 61/30* (2022.01)
*H04L 61/50* (2022.01)

(52) U.S. Cl.
CPC .......... *H04L 12/4633* (2013.01); *H04L 61/30* (2013.01); *H04L 61/50* (2022.05)

(58) Field of Classification Search
None
See application file for complete search history.

(56) References Cited

U.S. PATENT DOCUMENTS

| | | | | |
|---|---|---|---|---|
| 2002/0133608 A1* | 9/2002 | Godwin | .................. | H04L 63/06 709/230 |
| 2014/0269702 A1* | 9/2014 | Moreno | .............. | H04L 61/5038 370/390 |
| 2016/0277355 A1* | 9/2016 | Shetty | .................. | H04L 45/745 |
| 2018/0337839 A1* | 11/2018 | Bristow | .............. | H04L 12/4633 |
| 2019/0342118 A1* | 11/2019 | Duong | ................ | H04L 12/4633 |
| 2020/0021541 A1* | 1/2020 | Chanda | ................. | H04L 61/103 |
| 2021/0044538 A1* | 2/2021 | Hu | .......................... | H04L 45/34 |
| 2021/0168125 A1* | 6/2021 | Vemulpali | ............. | H04L 9/0825 |
| 2021/0176130 A1* | 6/2021 | Pani | ...................... | H04L 43/065 |
| 2021/0352017 A1* | 11/2021 | Williams | ............ | H04L 12/4633 |
| 2022/0021646 A1* | 1/2022 | Joshi | ................... | H04L 67/1001 |

FOREIGN PATENT DOCUMENTS

| | | | | |
|---|---|---|---|---|
| AU | 2018203702 A1 | * | 6/2018 | ......... G06F 9/45558 |
| CA | 2604232 A1 | * | 11/2006 | ........ H04L 29/12113 |
| WO | WO-2019105461 A1 | * | 6/2019 | ............. H04L 12/46 |
| WO | WO-2019105461 A1 | * | 6/2019 | ............. H04L 12/46 |

\* cited by examiner

*Primary Examiner* — Phyllis A Book

(74) *Attorney, Agent, or Firm* — Fountainhead Law Group P.C.

(57) ABSTRACT

Provisioning a set of tunnel endpoint aliases for a tunnel endpoint. A request is sent from the first tunnel endpoint to the second tunnel endpoint over a control plane of a network to provision the set of tunnel endpoint aliases. The second tunnel endpoint generates the set of tunnel endpoints and sends a response including the set of tunnel endpoint aliases to the first tunnel endpoint over the control plane. The first tunnel endpoint sends network traffic over the network tunnel that includes a tunnel endpoint alias of the set of tunnel endpoint aliases received.

20 Claims, 10 Drawing Sheets

AUTOMATIC RSVP TUNNEL ENDPOINT ALIASING

BACKGROUND

The present application relates to network tunneling and, more particularly, to provisioning aliases for tunnel end points.

In some communication networks, a tunnel may be established between two endpoints for network communications between the endpoints. It may be desirable to use this tunnel for network communications involving one or more other nodes in the communication network. Previously, configuring devices in the communication network to use the tunnel for communications involving other nodes may include manually configuring one or more network devices, e.g., by a technician or network administrator. This manual procedure can be an onerous and cumbersome task for an operator if the number of network devices in the network is large. Moreover, the computing resources involved in such configurations can be significant.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Overview

Figure 1:
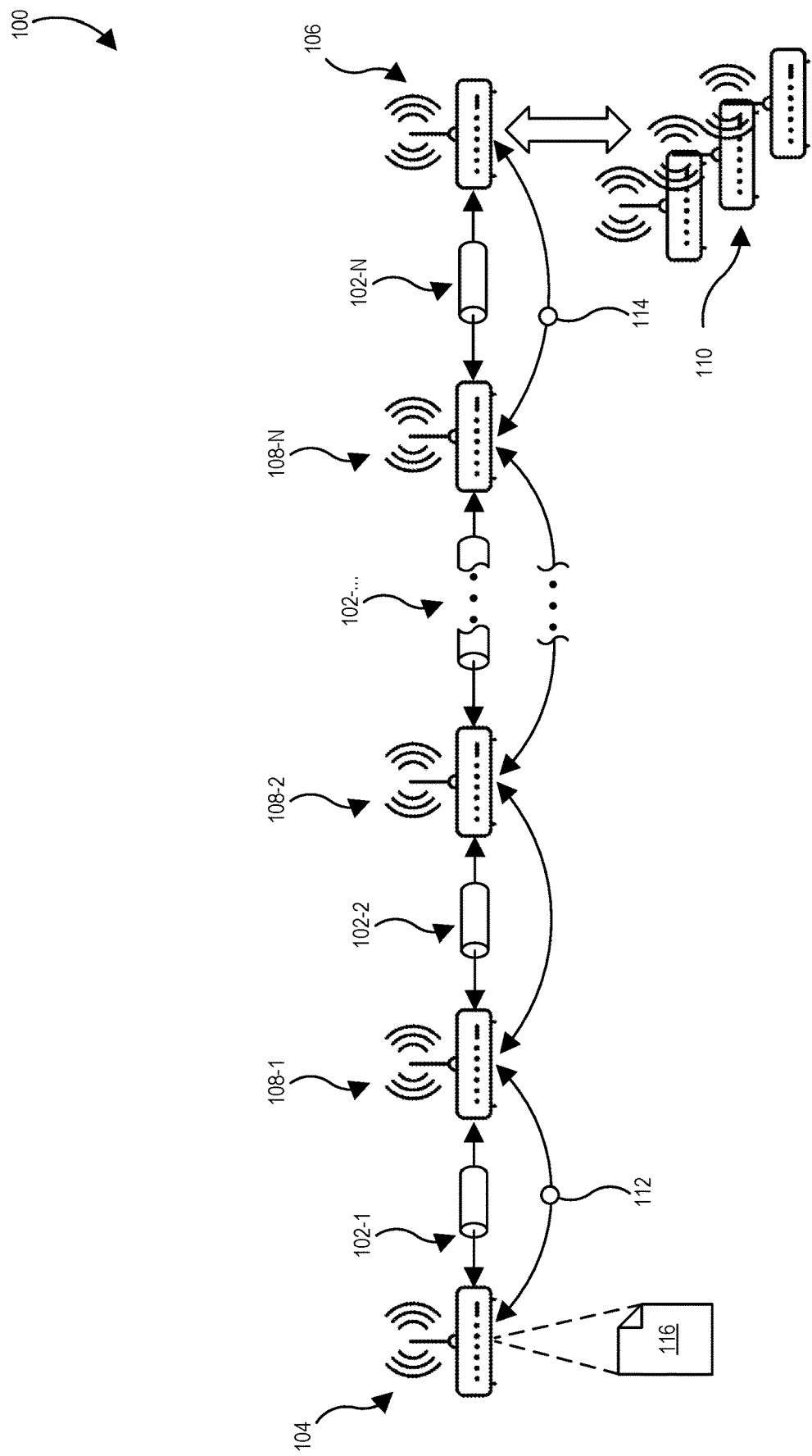
FIG. 1 illustrates an example network topology in which a network device is automatically configured to communicate using tunnel endpoint aliases according to one or more embodiments.

The present disclosure describes an automatic mechanism for defining, distributing, and installing Tunnel Endpoint (TEP) aliases. In the following description, for purposes of explanation, numerous examples and specific details are set forth to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Network virtualization is the ability to decouple the physical topology of a network from a virtual topology using tunneling, for example. The physical topology or underlay network is the physical infrastructure that transports data packets across the network. The virtual topology or overlay network is built on top of the underlay network and is a virtual transport network of nodes and logical links where multiple layers of network abstraction can be created. The transport network is adapted to control the sequence of overlay nodes a data packet traverses before reaching its destination. By decoupling the underlay network from applications, network-wide virtualization can optimize computing and storage resources. Network virtualization has become a central part of network design for some organizations.

Tunneling methods aid in network virtualization and provide a simple interface for the transport networks. Tunnels can be established between virtual endpoints (e.g., routers) in the underlay network, allowing for movement of data across a network or from one network to another in the overlay network. For example, one or more tunnels can be used to create a Virtual Private Network (VPN) over public data networks. To establish a tunnel between two virtual endpoints, the internet protocol (IP) addresses reachable by the endpoints are known. IP addresses are numerical labels assigned to each device connected to a network that uses IP to communicate.

Resource Reservation Protocol-Traffic Engineering (RSVP-TE) is a protocol for Label Switched Paths (LSPs) in an Internet Protocol (IP) transmission scheme, an asynchronous transfer mode (ATM) transmission scheme, and Ethernet, for example. RSVP-TE network tunnels are provided on a source router and installed into a Routing Information Base (RIB) after the corresponding Multi-protocol Label Switching (MPLS) LSPs have been established successfully. Apart from a network device that is a tunnel destination node and a TEP, the tunnel may be used for other communications involving other nodes that are local to the tunnel destination node. The techniques described herein provide an automated process for configuring one or more network devices to utilize TEP aliases for communications involving other nodes than the TEPs.

Additional aliases can be created for RSVP tunnel endpoints, which may be used to resolve IPv6 next hops using an IPv4 signaled RSVP tunnel, for example. Adding these aliases requires a skilled worker, such as a technician or network administrator, to manually provide the endpoint aliases on one of the endpoints, which is a cumbersome task because the alias addresses match the loopback IP addresses configured on the tunnel egress device. Provided herein are techniques that enable automatic creation and provisioning of the endpoint aliases automatically and without manual configuration.

System Architecture

FIG. 1 illustrates an example network topology 100 in which a network device is automatically configured to communicate using tunnel endpoint (TEP) aliases according to one or more embodiments. The network topology 100 includes a plurality of tunnel segments 102-1, 102-2, . . . 102-N that collectively comprise a tunnel 102 for communicating between a first TEP 104 and a second TEP 106. The network topology 100 also includes a set of intermediate network nodes 108-1, 108-2, . . . 108-N (collectively "intermediate network nodes 108") between the first TEP 104 and the second TEP 106. One or more of the intermediate network nodes 108 may be transit routers, for example. Adjacent pairs of the intermediate network nodes 108 are communicatively coupled via a tunnel segment of the tunnel 102. For instance, an intermediate network node 108-1 and an intermediate network node 108-2 are communicatively coupled via a tunnel segment 102-2. The intermediate network nodes 108 may also be communicatively coupled to each other via a control plane of one or more networks.

The first TEP 104, the second TEP 106, and the intermediate nodes 108 are network devices that mediate communications between processor-based devices (e.g., mobile devices, laptops, servers) connected to the network devices. In some embodiments, the first TEP 104 and the second TEP 106 are routers that are connected to processor-based devices on a local network (e.g., local area network) provisioned at least in part by the respective network device. The second TEP 106 is communicatively coupled to a set of network devices 110 that are configured to mediate network traffic between the second TEP 106 and one or more processor-based devices that are connected to the set of network devices 110 over one or more networks.

The second TEP 106 establishes a set of TEP aliases that are used in communications with network devices other than the second TEP 106 over the tunnel 102. For instance, a communication originating from a processor-based device connected to the first TEP 104 may include a TEP alias associated with a first network device of the set of network devices 110. To enable communications using the TEP aliases, the first TEP 104 performs an automated process for obtaining a set of alias addresses associated with the set of network devices 110 with which the second TEP 106 is connected. During a procedure for or in connection with establishing the tunnel 102, the first TEP 104 determines that the second TEP 106 is configured to participate in the automated process. In some embodiments, the automated process performed by the first and second TEPs 104 and 106 may be initiated by an authorized user, such as a network administrator or technician.

The first TEP 104 sends a request 112, over a control plane of one or more networks, to the second TEP 106 to provision TEP aliases associated with the set of network devices 110. The request 112, more particularly, specifies an identifier of the second TEP 106 as the recipient of the request 112. The request 112, in some embodiments, is transmitted between the intermediate network nodes 108 on the control plane, which is separate from a data plane of the one or more networks. As a result of the second TEP 106 receiving and processing the request 112, the second TEP 106 generates a response 114 that includes the TEP aliases of the set of network devices 110. The second TEP 106 sends the response 114 to the first TEP 104 via the control plane. The response 114, in some embodiments, is transmitted between the intermediate nodes on the control plane.

Each of the set of intermediate nodes 108 adds, to the response 114, identifying information identifying the set of intermediate nodes 108. For example, the second intermediate node 108-2 adds, to the response 114, information identifying the second intermediate node 108-2. The second intermediate node 108-2 sends the response 114 (including the identifying information) to the first intermediate node 108-1 via the tunnel segment 102-2. The first intermediate node 108-1 adds, to the response 114, information identifying the first intermediate node 108-1. The first intermediate node 108-1 sends the response 114 (including the identifying information) to the first TEP 104 via the tunnel segment 102-1. The response 114 may also cause the set of intermediate nodes 108 to reserve network resources for facilitating communications between the first and second TEPs 104 and 106.

The first TEP 104 receives the response 114 and processes the response 114 to obtain a set of TEP aliases 116. The first TEP 104 may use the set of TEP aliases 116 to mediate communications between a set of devices connected to the first TEP 104 (see FIG. 2) and the set of network devices 110 via the tunnel 102. As a result, the tunnel 102 may be used to mediate communications between the first TEP 104 and devices connected to the second TEP 106. Moreover, the first TEP 104 may be automatically configured with the set of TEP aliases 116 without manual configuration by an authorized entity, such as a network administrator or technician.

Figure 2:
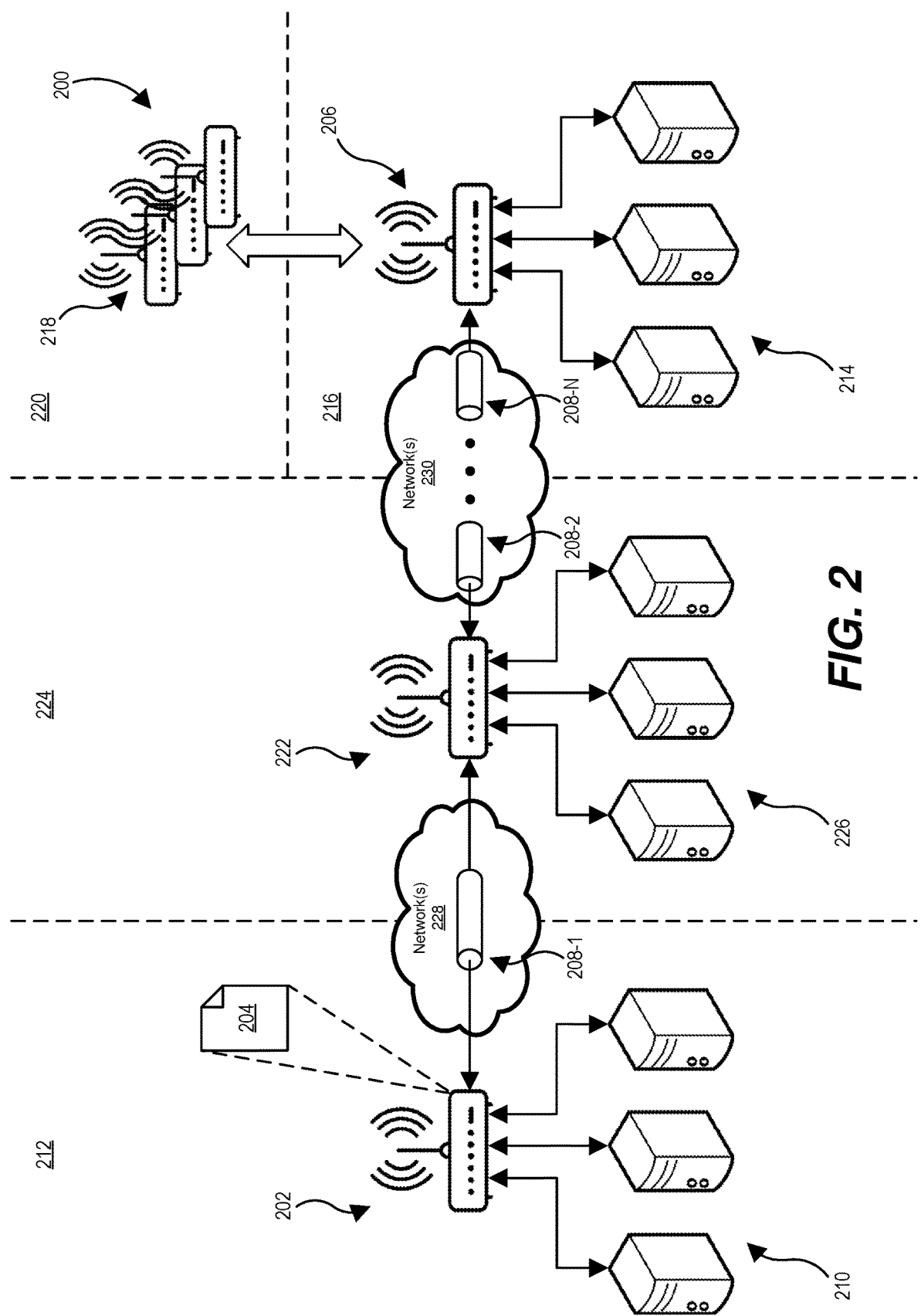
FIG. 2 illustrates a network topology in which a network device is automatically configured to communicate using tunnel endpoint aliases according to one or more embodiments.

FIG. 2 illustrates a network topology 200 in which a network device is automatically configured to communicate using tunnel endpoint (TEP) aliases according to one or more embodiments. A first TEP 202 obtains a set of TEP aliases 204 associated with a second TEP 206 via a tunnel 208 comprised of tunnel segments 208-1, 208-2, . . . 208-N. The first TEP 202 may be connected to a first set of processor-based devices 210 over one or more networks, which may include a first local area network. The first TEP 202 and the first set of devices 210 are located in a first region 212.

The second TEP 206 is connected to a second set of processor-based devices 214 over one or more networks, which may include a second local area network different than the first local area network of the first TEP 202. The second TEP 206 and the second set of devices 214 are located in a second region 216 that is different than the first region 212.

The first TEP 202 may use the set of TEP aliases 204 to communicate with a set of network devices 218 that correspond to a subset of TEP aliases 204. The set of network devices 218 may be in one or more locations 220 different than a location of the second TEP 206. In some embodiments, one or more of the set of network devices 218 may be located in a different region than the second region 216, such as a different state, province, or country. In some embodiments, the location 220 of the set of network devices 218 may be a different location within the second region 216, such as a different building, campus, or city.

The network topology 200 also includes one or more intermediate network devices 222 located in one or more regions 224, which may be regions other than the first region 212 and/or the second region 216. A third set of processor-based devices 226 are connected to the intermediate network device 222 over one or more local networks. Although a single intermediate network device 222 is shown, it is understood that the network topology 200 may include a plurality of intermediate network devices each provided between tunnel segments of the tunnel 208.

The tunnel segment 208-1 is established over one or more networks 228 between the first TEP 202 and the intermediate network device 222. One or more tunnel segments 208-2, . . . 208-N are established over one or more networks 230 between the intermediate network device 222 and the second TEP 206. Those skilled in the art will appreciate that the first region 212 and the second region 216 may be remotely located from each other over a long distance. By way of non-limiting example, the first TEP 202 may be located in a first country and the second TEP 206 may be located in a second country. As a result of using the set of TEP aliases 204, communications may be conveyed between the first TEP 202 and the second TEP 206 as well as communications between the first TEP 202 and the set of network devices 218.

Figure 3:
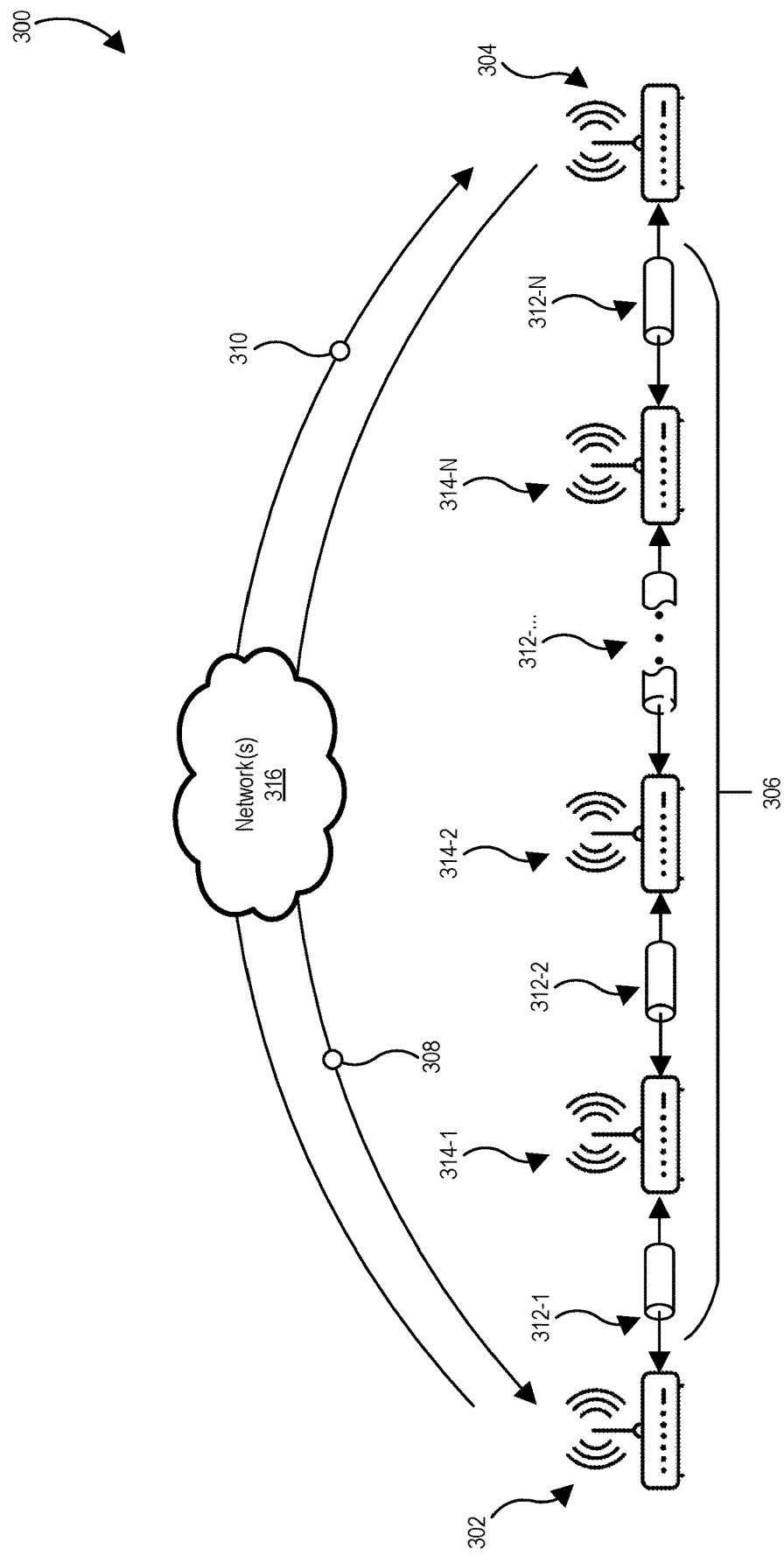
FIG. 3 illustrates a network topology in which a network tunnel is established between tunnel endpoints according to one or more embodiments.

FIG. 3 illustrates a network topology 300 in which a network tunnel is established between tunnel endpoints according to one or more embodiments. In some embodiments, the network topology 300 may include a Multiprotocol Label Switching (MPLS)-based EVPN in which the network nodes (e.g., routers 104 and 106, as well as other devices not shown in FIG. 1) maintain an Ethernet Virtual Private Network (EVPN) using one or more appropriate communication protocols, such as Border Gateway Protocol (BGP), by way of non-limiting example. In some embodiments, the network topology 300 may use Virtual Extensible LAN (VXLAN) technology and similar network virtualization technology to build tunnels.

The network topology 300 includes a first TEP 302 and a second TEP 304 communicatively coupled by a tunnel 306. The first and second TEP 302 and 304 include layer 2 network devices (e.g., routers, switches) that establish the tunnel 306 according to a centralized or distributed VXLAN gateway deployment mode, such as a static mode or a dynamic mode. The first and second TEPs 302 and 304 are configured to perform a process for automatically provisioning the first TEP 302 with a set of TEP aliases, as described herein.

In connection with establishment of the tunnel 306, the first TEP 302 receives endpoint information 308 regarding the second TEP 304, and/or the second TEP 304 receives endpoint information 310 regarding the first TEP 302. In some embodiments, the endpoint information 308 and 310 may respectively include an identifier of the second TEP 304 and/or an identifier of the first TEP 302. In some embodiments, the endpoint information 308 may include information indicating whether the second TEP 304 is configured to participate in the automated process for provisioning a set of TEP aliases described herein. In some embodiments, the endpoint information 310 may include information indicating whether the first TEP 302 is configured to participate in the automated process for provisioning a set of TEP aliases described herein. Some or all of the endpoint information 308 and/or 310 may be received as a condition precedent to establishing the tunnel 306, as a part of the process of establishing the tunnel 306, or as a result of the tunnel 306 being successfully established.

In some embodiments, in connection with establishment of the tunnel 306, the first and second TEPs 302 and 304 exchange routing and reachability information among the various devices within the EVPN. The routing and reachability information can include MAC/IP routes for the hosts, which are reachable by a network device broadcasting the MAC/IP routes. The routing and reachability information also includes the IP address of the network device broadcasting the routing and reachability information. For example, the routing and reachability information advertised by first TEP 302 may include the MAC/IP routes of the set of devices 210 and the IP address of the first TEP 302, which services the first set of devices 210 (see FIG. 2), wherein the IP address of the first TEP 302 is provided in an IP format (e.g., IPv4, IPv6). The routing and reachability information advertised by the second TEP 304 may include the MAC/IP routes of the second set of devices 214 and the IP address for the second TEP 304, which services the second set of devices 214, wherein the IP address of the second TEP 304 is provided in an IP format. The first and second TEP 302 and 304 use the information received from one another to establish the tunnel 306.

As a result of establishing the tunnel 306, the first and second TEP 302 and 304 can transmit network traffic received from their respective groups of devices and route the network traffic via the tunnel 306. In some embodiments, the tunnel 306 may use an MPLS Label Switched Path (LSP) infrastructure, which provides the benefits of MPLS technology, such as fast reroute, resiliency, etc. In some embodiments, the tunnel 306 may use Generic Routing Encapsulation tunneling, IP tunneling, VXLAN, or other suitable tunneling methodologies.

In some embodiments, the tunnel 306 includes a plurality of tunnel segments 312-1, 312-2, . . . 312-N that connect logically adjacent network devices of the tunnel 306. In some embodiments, the network topology 300 includes one or more intermediate network devices 314-1, 314-2, . . . 314-N that are each provided between adjacent segments of the tunnel segments 312-1, 312-2, . . . 312-N. In some embodiments, the endpoint information 308 and/or 310 may be transmitted over one or more networks 316. In connection with establishing the tunnel 306, the first TEP 302 and/or the second TEP 304 receive information identifying one or more of the intermediate network devices 314-1, 314-2, . . . 314-N. Examples of such identifying information include IP addresses and MAC addresses of the intermediate network devices 314-1, 314-2, . . . 314-N.

Figure 4:
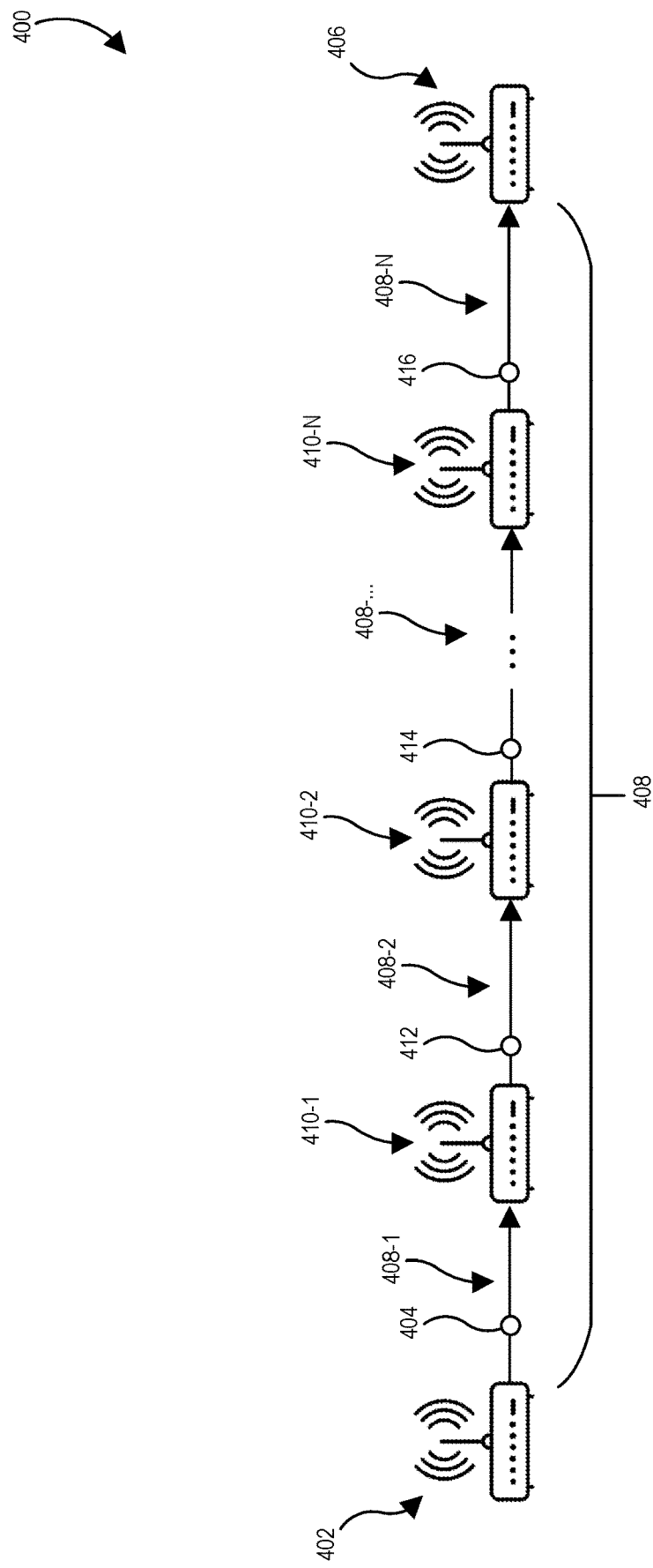
FIG. 4 illustrates a network topology in which a first tunnel endpoint sends a request to a second tunnel endpoint over one or more networks according to one or more embodiments.

FIG. 4 illustrates a network topology 400 in which a first TEP sends a request to a second TEP over a set of network segments according to one or more embodiments. A first TEP 402 sends a request 404 to a second TEP 406 via a control plane of a network 408. The network 408 comprises a plurality of network segments 408-1, 408-2, . . . 408-N that are connected between logically adjacent nodes in the network topology 400. In some embodiments, the request 404 is generated and sent by the first TEP 402 as part of the process of establishing, maintaining, or controlling a network tunnel described with respect to FIG. 3 and elsewhere herein. In some embodiments, the request 404 is generated and sent by the first TEP 402 as a result of successfully establishing the network 408 and determining that the second TEP 406 is configured to participate in the process of provisioning a set of TEP aliases described herein. The first TEP 402 may, for example, determine that the second TEP 406 is running software or a particular version of software that facilitates provisioning a set of TEP aliases.

The request 404, in some embodiments, includes a PATH message that travels through a set of intermediate nodes 410-1, 410-2, . . . 410-N (collectively "intermediate nodes 410") before reaching the second TEP 406. The request 404 is for the second TEP 406 to provision a set of TEP aliases. The request 404 may be generated according to an appropriate protocol, such as the RSVP-TE protocol. The request 404 may include a variety of relevant information. In some embodiments, the request 404 includes information identifying each of the intermediate nodes 410 (e.g., IP address, MAC address). In some embodiments, the request 404 includes information indicating the order through which the request 404 will travel through the intermediate nodes 410.

The intermediate nodes 410 sequentially receive the request 404, process the request 404, and send the request 404 to the next recipient of the network 408. The request 404 received includes information or instructions that cause the intermediate nodes 410 to update or add information to the request 404. For instance, the intermediate node 410-1 receives the request 404 from the first TEP 402 and updates a route record data object of the request 404 to include identifying information of the intermediate node 410-1, such as an IP address or a MAC address. The intermediate node 410-1 sends an updated request 412 that includes the identifying information of the intermediate node 410-1 to the intermediate node 410-2 via the network segment 408-2. The intermediate node 410-2 generates an updated request 414 by at least adding or updating the updated request 412 to include the identifying information of the intermediate node 410-2. The intermediate node 410-2 sends the updated request 414 to the next recipient of the network 408. The second TEP 406 receives an updated request 416 that includes the request 404 and the identifying information of the set of intermediate nodes 410.

Figure 5:
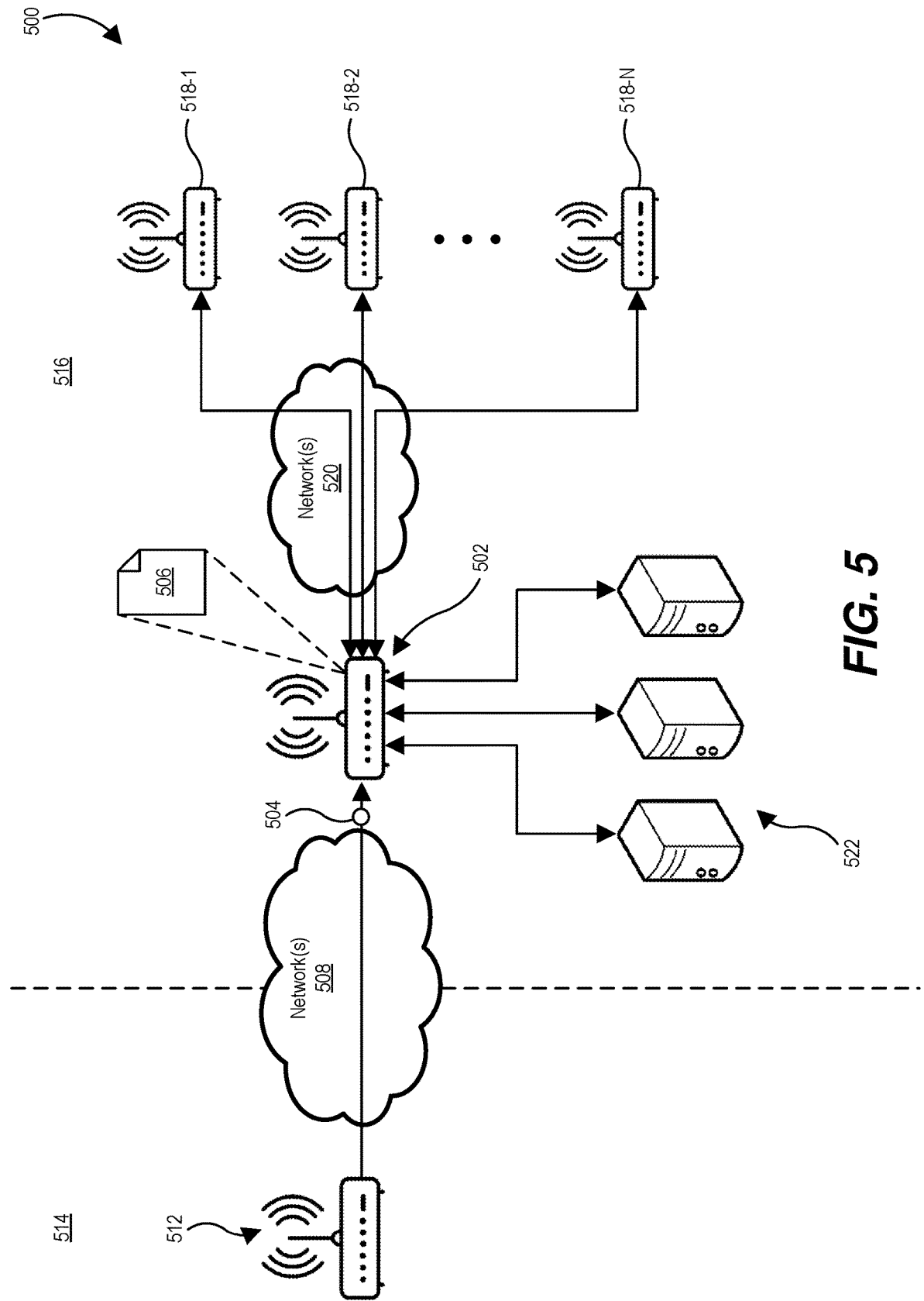
FIG. 5 illustrates a network topology in which a second tunnel endpoint receives a request to provision a set of tunnel endpoint aliases according to one or more embodiments.

FIG. 5 illustrates a network topology 500 in which a second TEP 502 receives a request 504 to provision a set of TEP aliases 506 according to one or more embodiments. Operations described with respect to the network topology 500 are performed subsequent to operations described with respect to the network topology 400 of FIG. 4. In some embodiments, the request 504 is received by the second TEP 502 over one or more networks 508.

The request 504 is generated by a first TEP 512 and is transferred through the network 508 and may travel through one or more intermediate nodes, as described with respect to FIG. 4 and elsewhere herein. The first TEP 512 may be located in a first region 514 that is remotely located from a second region 516 in which the second TEP 502 is located. For example, the first region 514 may be a region of a first continent whereas the second region 516 may be a region of a second continent.

The second TEP 502 processes the request 504 and determines the set of TEP aliases 506 to be provided to the first TEP 512. The set of TEP aliases 506 include identifiers to be provided to the first TEP 512. The second TEP 502 is communicatively coupled (e.g., via wireless connection) with a set of network devices 518-1, 518-2, . . . 518-N (collectively "network devices 518") via one or more networks 520. The set of network devices 518 are configured to mediate communications between the second TEP 502 and one or more processor-based devices (e.g., laptops, servers, mobile devices). Non-limiting examples of the set of network devices 518 include hubs, network switches, and routers. In some embodiments, the second TEP 512 may be communicatively coupled with a set of processor-based devices 522 over a local area network or a virtual local area network.

In some embodiments, the set of TEP aliases 506 include one or more IPv4 addresses. In some embodiments, the set of TEP aliases 506 include one or more IPv6 addresses. In some embodiments, the set of TEP aliases 506 include at least one IPv4 address and at least one IPv6 address. As discussed herein, the set of TEP aliases 506 may be used to transmit network traffic of a first communication protocol over the one or more networks 508 established according to a second communication protocol.

In some embodiments, the second TEP 502 determines a set of loopback addresses of the set of network devices 518. In such embodiments, one or more of the set of loopback addresses may be included in the set of TEP aliases 506. In some embodiments, the second TEP 502 generates a set of identifiers to be included in the set of TEP aliases 506. For instance, the second TEP 502 may generate a set of IP addresses that are not in use by the second TEP 502 or the set of network devices 518.

In some embodiments, the request 504 may include a set of candidate identifiers (e.g., IP addresses) provided by the first TEP 512. In such embodiments, the second TEP 502 may evaluate the set of candidate identifiers based on whether the set of candidate identifiers conflict with currently used identifiers—for example, whether the set of candidate identifiers are in use by other network devices or processor-based devices 522 associated with the second TEP 502. As a result of detecting a conflict between a candidate identifier and a currently used identifier, the second TEP 502 may use a select a non-conflicting candidate identifier, generate a new candidate identifier, or request a new candidate identifier from the first TEP 512.

The request 504 may include a request to reserve network resources for the set of TEP aliases 506. The request 504, by way of non-limiting example, may request an amount of network bandwidth to be reserved for network traffic involving the set of TEP aliases 506. As another non-limiting example, the request 504 may request an amount of network throughput to be reserved for network traffic involving the set of TEP aliases 506. The second TEP 502 may reserve network resources for the network 508 based on the request 504. As a further non-limiting example, the request 504 may request a buffer size to be reserved for network traffic involving the set of TEP aliases 506. The second TEP 502 may reserve network resources for the network 508 based on the request 504.

Figure 6:
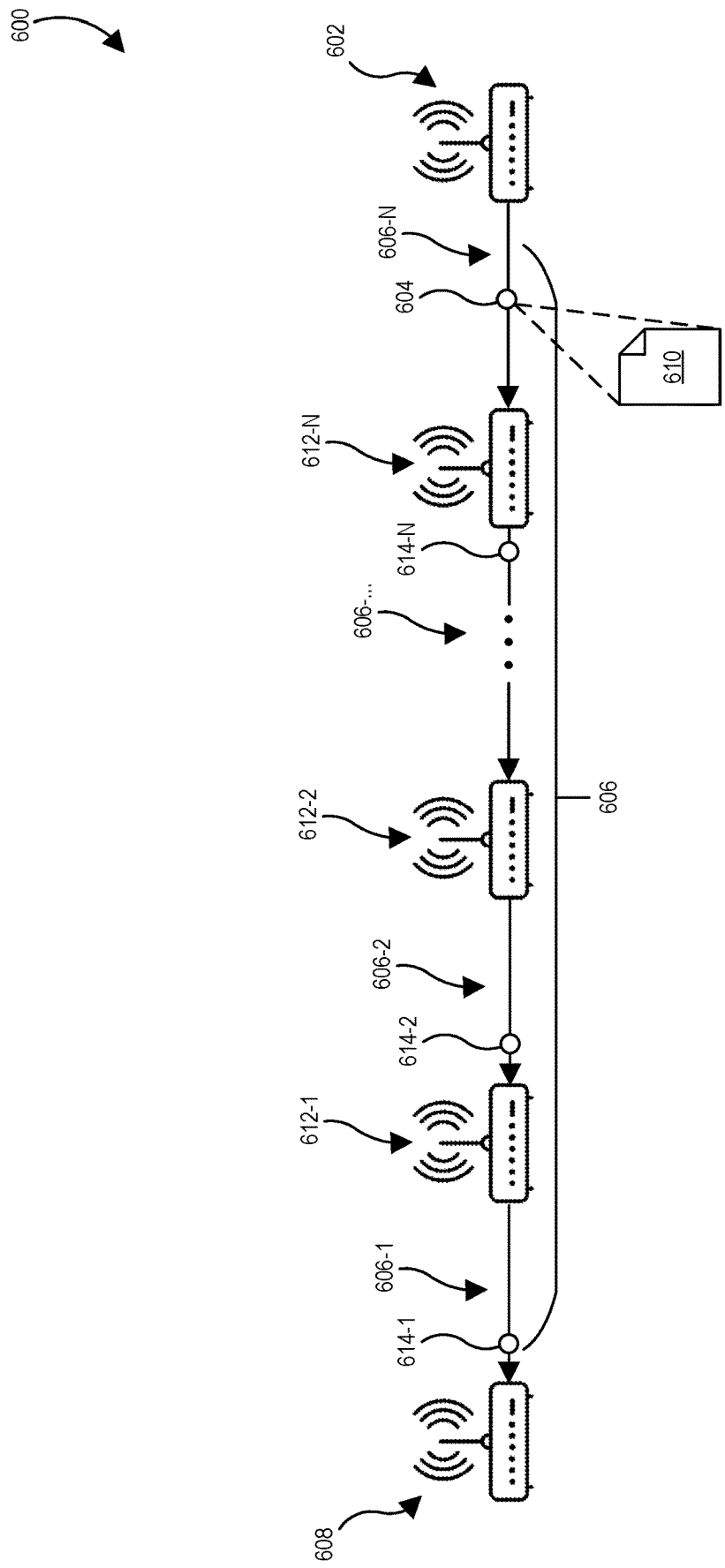
FIG. 6 illustrates a network topology in which a second tunnel endpoint sends a response to a request to provision a set of tunnel endpoint aliases according to one or more embodiments.

FIG. 6 illustrates a network topology 600 in which a second TEP 602 sends a response 604 to a request to provision a set of TEP aliases according to one or more embodiments. Operations described with respect to the network topology 600 are performed subsequent to operations described with respect to the network topology 500 of FIG. 5. The second TEP 602 sends the response 604 over a control plane of a network 606, which may comprise a set of network segments 606-1, 606-2, . . . 606-N, to a first TEP 608. The response 604 includes a set of TEP aliases 610 generated as described with respect to FIG. 4 and elsewhere herein. The second TEP 602 stores a record of the set of TEP aliases 610 in memory for processing communications received from the first TEP 608 via the network 606, as described herein. The response 604 may include an actual identifier of the second TEP 602, such as an IP address or MAC address of the second TEP 602.

In some embodiments, the response 604 includes a reservation (RESV) message requesting reservation of network resources of a set of intermediate nodes 612. For instance, the response 604 may specify an amount of network resources to be reserved. Non-limiting examples of network resources include network bandwidth (e.g., transfer capacity, average bit rate, peak bit rate) and network throughput (e.g., maximum throughput, asymptotic throughput, peak throughput).

In some embodiments, second TEP 602 generates a data object that is included in the response 604. In some embodiments, the second TEP 602, for instance, may include a Route Record Object (RRO) that is included in the response 604. In some embodiments, the second TEP 602 may generate a TEP alias object that includes the set of TEP aliases 610. The TEP alias object is included in the RESV message and may include a defined format, such as a heading indicating various information regarding the TEP alias object (e.g., object type, object origin, object destination, object size) and/or a payload providing the set of TEP aliases 610. The response 604 generated by the second TEP 602 may include a data object specifying network resources to be reserved by the set of intermediate nodes 612 for use in connection with network traffic involving the set of TEP aliases 610.

The set of intermediate nodes 612 successively receive the response, update the response, and send the updated response to the next intermediate node in the network 606. In some embodiments, individual nodes of the set of intermediate nodes 612 include additional information in the updated response. Individual nodes of the set of intermediate nodes 612 may, for instance, update the response received to include identifying information and/or information regarding reserved network resources. In some embodiments, individual nodes of the intermediate nodes 612 may update the response received to indicate whether network resources included in the request 604 (see FIG. 5) were successfully reserved or may update the response received to indicate an amount of network resources that were successfully reserved in fulfillment of the request 604.

As a non-limiting example, the intermediate node 612-N adjacent to the second TEP 602 in the network 606 receives the response 604 and may update the response 604 to generate an updated response 614-N. For instance, the intermediate node 612-N may generate the updated response 614-N by at least updating an RRO in the response 604 to include an identifier of the intermediate node 612-N, such as an IP address or a MAC address of the intermediate node 612-N. The updated response 614-N may include an indication of whether the requested network resources in the request 604 were successfully reserved. The intermediate node 612-N sends the updated response 614-N to the next intermediate node in the network 606, such as the intermediate node 612-2. The intermediate node 612-2 generates an updated response 614-2 and sends the updated response 614-2 to the intermediate node 612-1. The intermediate node 612-1 receives the updated response 614-2, generates the updated response 614-1, and sends the updated response 614-1 to the first TEP 608. The updated response 614-1 includes the information included in the response 604 and the additional information included by the set of intermediate nodes 612.

As described herein, in some embodiments, the network 606 may not include any intermediate nodes 612. In such embodiments, the first TEP 608 receives the response 604 including the set of TEP aliases 610 from the second TEP 602 via the network 606.

Figure 7:
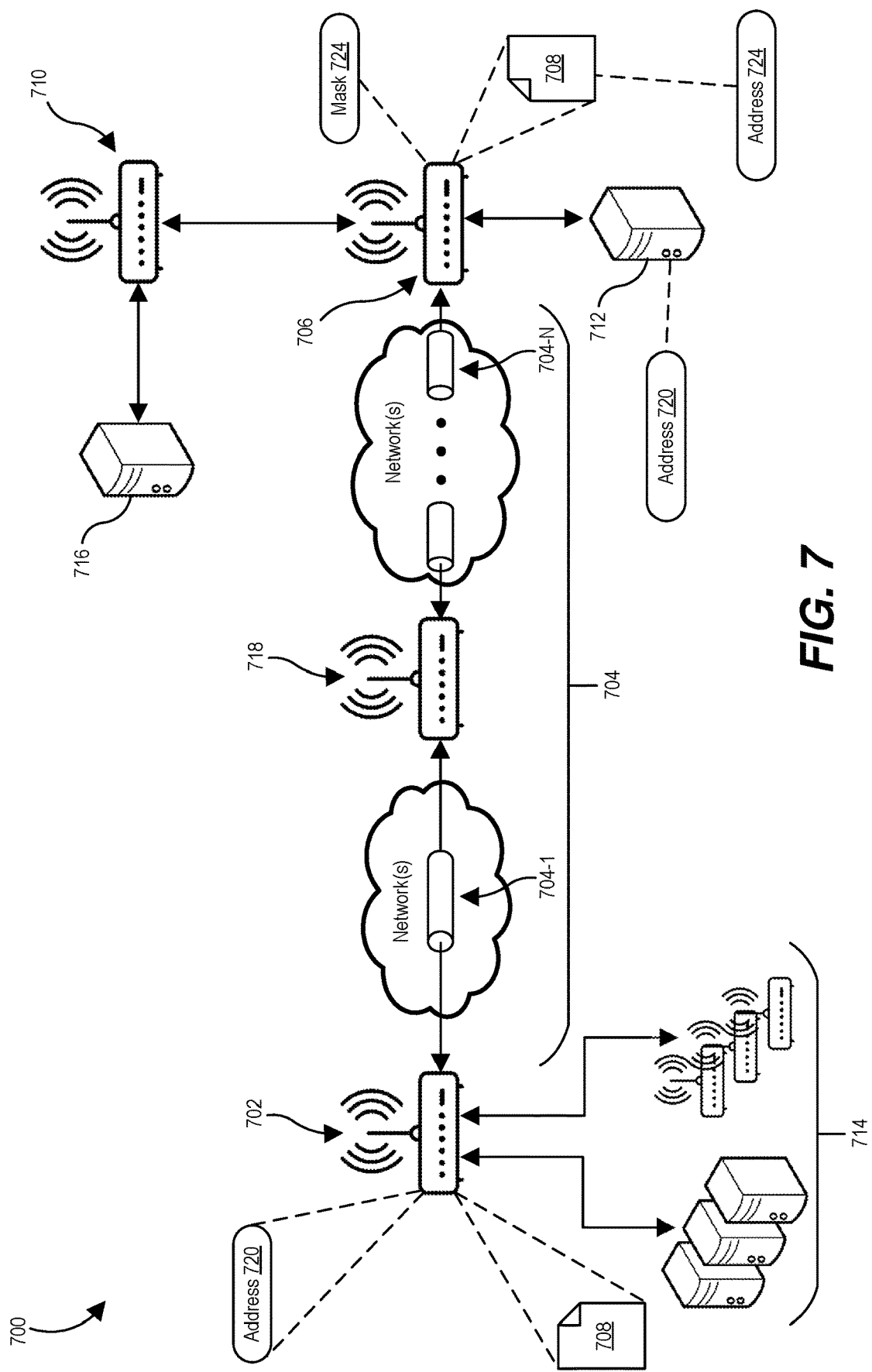
FIG. 7 illustrates a network topology in which a first tunnel endpoint sends network traffic over a network tunnel using a set of tunnel endpoint aliases according to one or more embodiments.

FIG. 7 illustrates a network topology 700 in which a first TEP sends network traffic over a network tunnel using a set of TEP aliases according to one or more embodiments. Operations described with respect to the network topology 700 are performed subsequent to operations described with respect to the network topology 600 of FIG. 6. A first TEP 702 processes a response received over a network tunnel 704 from a second TEP 706 to obtain a set of TEP aliases 708.

The set of TEP aliases 708 include one or more identifiers of the second TEP 706 that are different from a primary TEP identifier of the second TEP 706, such as an IP address or MAC address. Non-limiting examples of such identifiers include IP addresses and MAC addresses. In some embodiments, the set of TEP aliases 708 may include identifiers of one or more network devices or processor-based devices communicatively coupled with the second TEP 706. For instance, the set of TEP aliases 708 may include an identifier, such as a loopback address, of a network device 710 (e.g., network switch, network router) communicatively coupled with the second TEP 706 via one or more networks. A processor-based device 716 may be communicatively coupled to the network device 710 and the network device 710 may mediate communications between network device 710 and other devices through one or more networks. The set of TEP aliases 708 may include an identifier, such as a loopback address, of a processor-based device 712 (e.g., mobile device, laptop, server) communicatively coupled with the second TEP 706 via one or more local area networks. The network device 710 may be communicatively coupled to a processor-based device 716 via one or more local area networks. The first TEP 702 may receive the primary TEP identifier of the second TEP 706 as part of or in connection with establishing the network tunnel 704, as described with respect to FIG. 1, 2, or elsewhere herein.

The first TEP 702 updates a configuration of the first TEP 702 based on the set of TEP aliases 708. More particularly, the first TEP 702 may store, in memory, a record of device identifiers (e.g., IP addresses, MAC addresses) of tunnel endpoints for the tunnel 704. The device identifier record may be a data object, for example, formatted as a table, a list, or an array storing alphanumeric device identifiers and may include additional information. The first TEP 702 may update or establish the device identifier record to include the set of TEP aliases 708.

The first TEP 702 may advertise one or one or more of the set of TEP aliases 708 as endpoint identifiers for the tunnel 704. One or more devices of a set of devices 714 may use one or more of the set of TEP aliases 708 to communicate with or through devices (e.g., network device 710, processor-based device 712) associated with the second TEP 706. The set of devices 714 may comprise one or more network devices (e.g., network switches, network routers) and/or one or more processor-based devices (e.g., server, laptop, mobile device). One or more devices of the set of devices 714 may communicate with the network device 710 or the processor-based device 712, for example, through the network tunnel 704 via the first TEP 702 using a TEP alias of the set of TEP aliases 708.

The second TEP 706 may store, in memory, a record of the set of TEP aliases 708. The second TEP 706 may use the set of TEP aliases 708 to mediate communications over the tunnel 704 between the first TEP 702 and one or more devices associated with the second TEP 706, such as the network device 710 or the processor-based device 712. Communications between the first TEP 702 and the second TEP 706 over the tunnel 704 may utilize network resources allocated by one or more intermediate nodes 718 for the set of TEP aliases 708, as described with respect to FIGS. 5, 6, and elsewhere herein.

In some embodiments, the set of TEP aliases 708 may be used to transmit network traffic of a first communication protocol over the network tunnel 704 established according to a second communication protocol. As a non-limiting example, the network tunnel 704 may be established according to a first TCP/IP protocol, such as an IPv6 protocol. The network traffic may be sent over a data plane rather than the control plane of a network. The first TEP 702 may mediate network traffic over the tunnel 704 based on a second TCP/IP protocol different than the first TCP/IP protocol using the set of TEP aliases 708. The first TEP 702 may advertise an IPv4 address to the set of devices 714. The IPv4 address advertised may include a portion of one of the set of TEP aliases 708—for example, a 32-bit portion of a 64-bit address included in the set of TEP aliases 708.

The first TEP 702 may receive, from a processor-based device of the set of devices 714, network traffic encapsulated and addressed according to the IPv4 protocol. The first TEP 702 may reencapsulate the network traffic received according to the IPv6 protocol and transmit the reencapsulated network traffic over the network tunnel 704. Reencapsulating the network traffic may include modifying an IPv4 address in a header of the network traffic to match an IPv6 address specified in the set of TEP aliases 708. The first TEP 702 may receive network traffic that includes payload data and a 32-bit IPv4 destination address. The first TEP 702 may modify the network traffic to conform to the IPv6 protocol by combining the 32-bit IPv4 destination address with a 32-bit value to generate an IPv6 address. The first TEP 702 may then transmit the payload data received with the IPv6 address generated over the network tunnel 704 according to an IPv6 protocol.

The first TEP 702 may modify network traffic received to conform with other communication protocols of the network tunnel 704. By way of non-limiting example, the first TEP 702 may modify network traffic generated according to the IPv4 protocol to conform with an IPv6 protocol utilized for the tunnel 704, such as by truncating an IPv6 address in a header of network traffic received from one of the set of network devices 714 to conform with the IPv4 protocol. The tunnel 704 may use the IPv4 protocol and the set of TEP aliases 708 received by the first TEP 702 may include an IPv4 address. The first TEP 702 may generate an IPv6 address using the IPv4 address in the set of TEP aliases 708 by combining the IPv4 address with a 32-bit value. The first TEP 702 may advertise the IPv6 address generated to the set of devices 714 and the network traffic received by the first TEP 702 from one or more of the set of devices 714 may include the IPv6 address advertised. The first TEP 702 may modify the IPv6 network traffic received to conform with the IPv4 protocol by removing the 32-bit number. The first TEP 702 may then transmit the network traffic that includes the modified header having the IPv4 address over the tunnel 704.

The second TEP 706 may generate one or more TEP aliases of the set of TEP aliases 708 based on a communication protocol used for the network tunnel 704. The communication protocol may be different than a communication protocol format used by a device associated with the second TEP 706, such as the network device 710 or the processor-based device 712. The processor-based device 712, for example, may have an address 720 conforming to an IPv4 protocol whereas an IPv6 protocol may be used for communications over the network tunnel 704.

The second TEP 706 may obtain a mask 722 for converting the IPv4 address into an address 724 corresponding to the communication protocol of the tunnel 704. The second TEP 706 may generate the mask 722 or receive the mask 722 from the first TEP 702. The mask 722 may be, for instance, a 64-bit value of which 32 bits (e.g., the first 32 bits, the last 32 bits) are zeros and the remaining 32 bits collectively correspond to a non-zero integer value. The second TEP 706 may convert the IPv4 address into the address 724 conforming to the IPv6 protocol by performing a logical operation (e.g., OR operation) using the mask 722 and the IPv4 address 720. The second TEP 706 may include the address 724 generated in the set of TEP aliases 708.

The second TEP 706 may maintain a referential data object (e.g., look-up table) in which the address 724 generated is associated with the address 720. The second TEP 706 may compare identifiers received in communications over the tunnel 704 with the set of TEP aliases 708 or the referential data object. The second TEP 706 may receive a communication, over the tunnel 704, that includes the address 724. The second TEP 706 may determine a device corresponding to the address 724. In some embodiments, the second TEP 706 may compare the address received in the communication to addresses in the referential data object and determine that the communication should be routed to the processor-based device 712 based on the comparison. In some embodiments, the second TEP 706 may perform a logical operation (e.g., AND operation) involving the mask 722 and the address 724 to determine that the address 724 corresponds to the address 720 of the processor-based device 712. The first and second TEPs 702 and 706 may be configured to convert communications involving other communication protocols than the IPv4 and IPv6 protocols.

Figure 8:
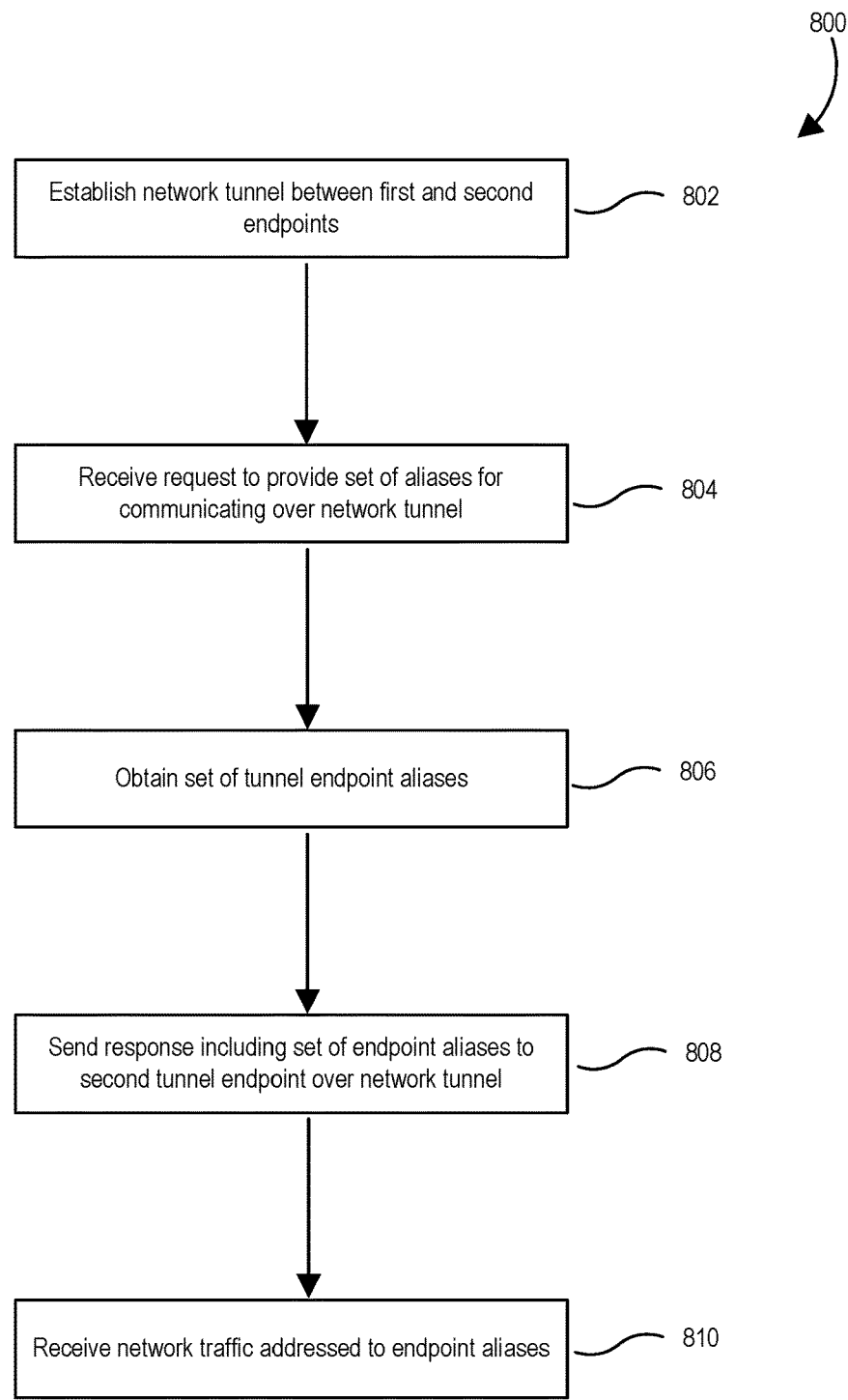
FIG. 8 illustrates a method for automatically provisioning a network device with a set of tunnel endpoint aliases according to one or more embodiments.

FIG. 8 illustrates a method 800 for automatically provisioning a network device with a set of TEP aliases according to one or more embodiments. The method 800 may be performed by one or more appropriate entities, such as the second tunnel endpoint or the tail-end endpoint described herein with respect to FIGS. 1 through 7. The method 800 includes establishing a network tunnel between a first tunnel endpoint and a second tunnel endpoint at 802, as described with respect to FIGS. 2 and 3. The network tunnel may be established based on a Multiprotocol Label Switching technique defined according to RFC 3031 and related sections of RFC. Communications via the network tunnel may be formatted according to an associated communication protocol, such as IPv4 or IPv6.

The method 800 includes receiving, at 804, a request to provide one or more aliases for communicating over a control plane of a network. The request received in 804 may be received via the network and may be generated by the first tunnel endpoint. In some embodiments, the request received in 804 may be included in a PATH message. The request may be received in 804 from an intermediate node of the network tunnel, as described herein.

The method 800 also includes obtaining, at 806 a set of tunnel endpoint (TEP) aliases that include identifiers associated with the second tunnel endpoint. Obtaining, at 806, may be in response to the request received. The set of TEP aliases obtained may be generated by a local policy defined for the second tunnel endpoint. Obtaining the set of TEP aliases by the second tunnel endpoint according to the local policy may include generating random addresses, select an identifier from a set of defined addresses stored in memory, or select an address from a range of addresses. In some embodiments, obtaining the set of TEP aliases includes determining an identifier of one or more devices communicatively coupled to the second TEP endpoint, such as a loopback address of the set of connected devices.

At 808, the method 800 includes sending a response including the set of endpoint aliases to the first tunnel endpoint over the control plane of the network. In some embodiments, the response may be included in an RESV message. The response is addressed to the first tunnel endpoint and may be sent to an intermediate node, as described herein. In some embodiments, the response may include a Route Record Object and an object separate from the Route Record Object, the set of TEP aliases included in the object. In some embodiments, the set of TEP aliases may be a sub-object of an object included in the response. In some embodiments, the sub-object may be a sub-object of the Route Record Object.

Subsequent to sending the response, the method 800 includes receiving, in 810, network traffic addressed to a TEP alias of the set of TEP aliases sent in 806. The second tunnel endpoint may route the network traffic to a device corresponding to the TEP alias, the device being communicatively coupled to the second tunnel endpoint. The connected device may be a network device or a processor-based device. The second tunnel endpoint may route the network traffic based on a comparison of the TEP alias with a set of defined device identifiers, which may be included in a referential data object, as described with respect to FIG. 7. In some embodiments, the network traffic may include a first identifier, such as an identifier formatted according to a first communication protocol. The second TEP may determine, based on the first identifier, a second identifier formatted according to a second communication protocol. The second tunnel endpoint may route the network traffic based on the second identifier. Determining the second identifier may include converting a format of the first identifier (e.g., IPv6) to a format conforming to the second communication protocol (e.g., IPv4), as discussed with respect to FIG. 7.

The second tunnel endpoint may repeat some or all of the method 800 to update the set of TEP aliases. For instance, one or more devices may be additionally connected to the second tunnel endpoint, or one or more devices may be disconnected from the second tunnel endpoint. As a result, the second tunnel endpoint may update the set of TEP aliases and send a communication to the first tunnel endpoint that includes an updated set of TEP aliases.

Figure 9:
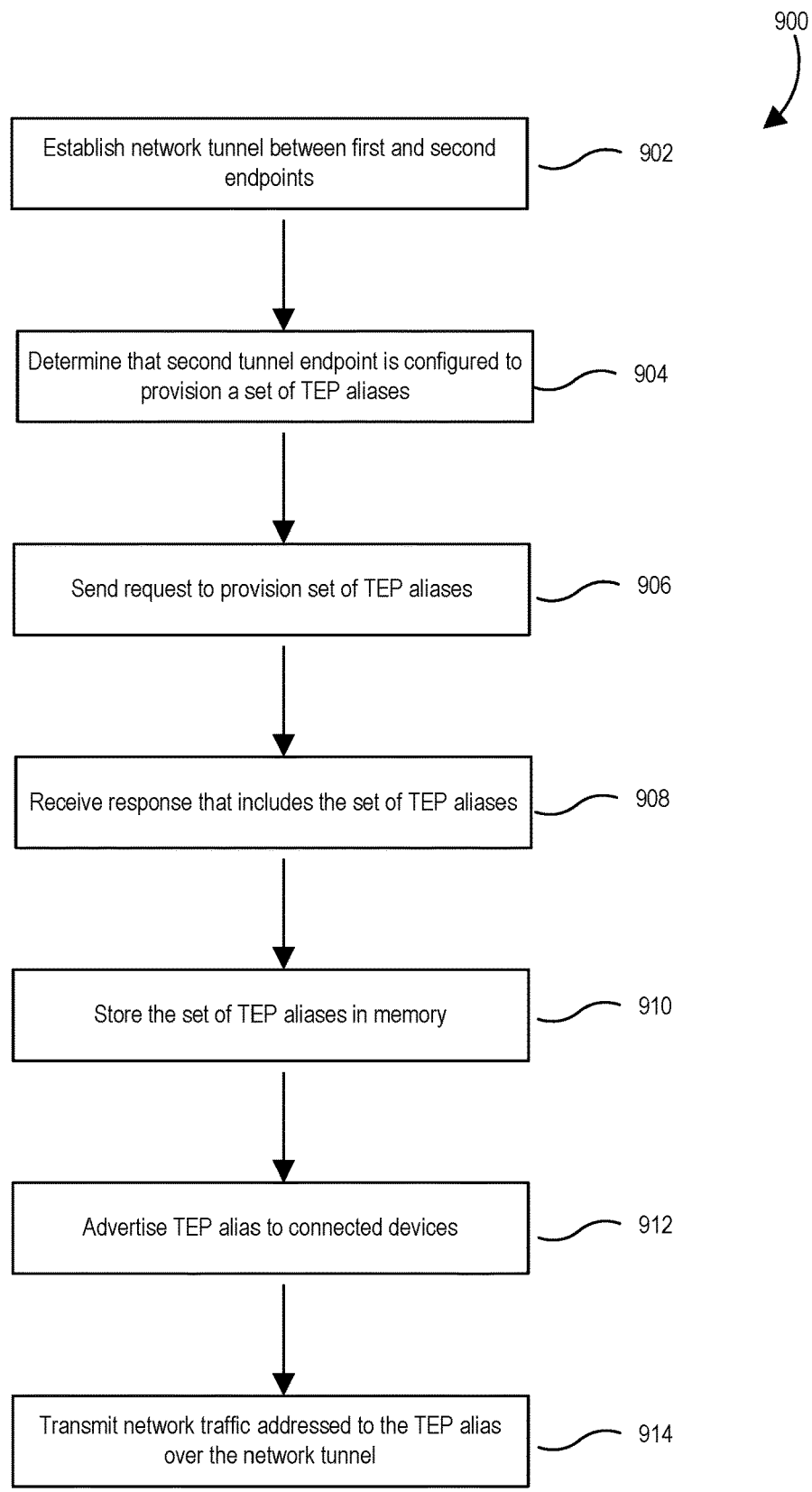
FIG. 9 illustrates a method for automatically provisioning a network device with a set of tunnel endpoint aliases according to one or more embodiments.

FIG. 9 illustrates a method 900 for automatically provisioning a network device with a set of TEP aliases according to one or more embodiments. The method 900 may be performed by one or more appropriate entities, such as the first tunnel endpoint or the headend endpoint described herein with respect to FIGS. 1 through 7. The method 900 includes establishing 902 a network tunnel between a first tunnel endpoint and a second tunnel endpoint, as described with respect to FIGS. 2 and 3. The network tunnel may be established in 902 based on a Multiprotocol Label Switching technique defined according to RFC 3031 and related sections of RFC. Communications via the network tunnel may be formatted according to an associated communication protocol, such as IPv4 or IPv6.

The method 900 includes determining that the second tunnel endpoint is configured to provision a set of TEP aliases at 904. In some embodiments, the first tunnel endpoint may receive configuration information regarding a configuration of the second tunnel endpoint. The configuration information may indicate software, firmware, operating system, or a version thereof that the second tunnel endpoint is running. The configuration information may particularly specify whether the second tunnel endpoint is configured to provision the set of TEP aliases. The configuration information may be provided as part of a handshake process between the first and second tunnel endpoints. In some embodiments, the second tunnel endpoint may provide, to the first tunnel endpoint, an information regarding whether the second tunnel endpoint is configured to provide the set of TEP aliases subsequent to establishment of the network tunnel.

The method 900 includes sending, at 906, a request to the second tunnel endpoint to provision the set of TEP aliases. The request in 906 may be sent over the a control plane of a network and may be generated by the first tunnel endpoint. In some embodiments, the request sent in 906 may be included in a PATH message. The request may be sent in 906 to an intermediate node of the network tunnel, as described herein.

At 908, the method 900 includes receiving a response including the set of endpoint aliases provided by the second tunnel endpoint over the network. In some embodiments, the response may be included in an RESV message. The response is addressed to the first tunnel endpoint and may be received from an intermediate node, as described herein. In some embodiments, the response may include a Route Record Object and an object separate from the Route Record Object, the set of TEP aliases included in the object. In some embodiments, the set of TEP aliases may be a sub-object of an object included in the response. In some embodiments, the sub-object may be a sub-object of the Route Record Object.

The method 900 further includes storing, at 910, the set of TEP aliases in memory of the first tunnel endpoint. In some embodiments, storing 910 the set of TEP aliases may include updating a data structure stored in the first tunnel endpoint. At 912, the method 900 includes advertising one or more TEP aliases of the set of TEP aliases on a network, such as a local area network. Devices connected to the first tunnel endpoint on the network may detect the availability of the TEP aliases advertised and use a TEP alias in communications sent over the network tunnel.

The first tunnel endpoint may receive network traffic that includes a TEP alias from the connected devices. For instance, the first tunnel endpoint may receive a data packet with a header that includes a TEP alias from a connected device. At 914, the method 900 includes transmitting the network traffic having the TEP alias over the network tunnel to the second tunnel endpoint.

In some embodiments, the first tunnel endpoint may repeat some or all of the operations of the method 900. For instance, the first tunnel endpoint may send a request to update the set of TEP aliases to the second tunnel endpoint and may receive a response including an updated set of TEP aliases over the network tunnel.

Figure 10:
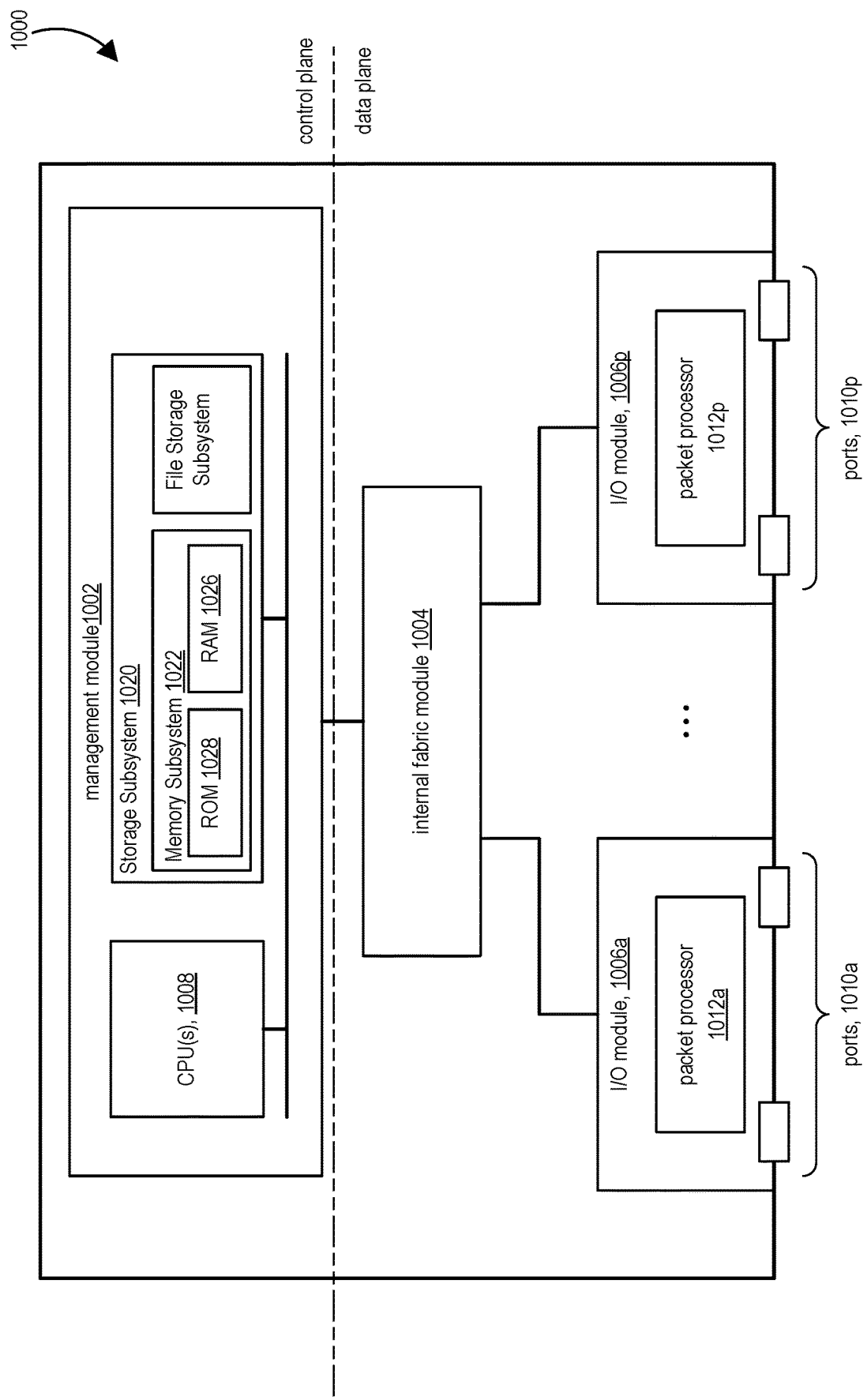
FIG. 10 illustrates a network device that is adapted to operate according to one or more embodiments of the present disclosure.

FIG. 10 illustrates a network device 1000 that is adapted to operate according to one or more embodiments of the present disclosure. The network device 1000 may be a switch or a router, for example. As shown, network device 1000 can include a management module 1002, an internal fabric module 1004, and a number of I/O modules 1006*a*-1006*p*. The management module 1002 may be disposed in a control plane (also referred to as control layer) of the network device 1000 and can include one or more management CPUs 1008 for managing and controlling operation of network device 1000 in accordance with the present disclosure. Each management CPU 1008 can be a general-purpose processor, such as an Intel®/AMD® x86-64 or ARM® processor, that operates under the control of software stored in memory, such as a storage subsystem 1020, which may include read-only memory 1028 and/or random-access memory 1026. In some embodiments, the CPU 1008 may include control circuitry, and may include or be coupled to a non-transitory storage medium storing encoded instructions that cause the CPU 1008 to perform operations described herein. In some embodiments, the non-transitory storage medium may include encoded logic or hardwired logic for controlling operation of the CPU 1008. The control plane refers to all the functions and processes that determine which path to use, such as routing protocols, spanning tree, and the like.

Internal fabric module 1004 and I/O modules 1006a-1006p collectively represent the data plane of network device 1000 (also referred to as data layer, forwarding plane, etc.). Internal fabric module 1004 is configured to interconnect the various other modules of network device 1000. Each I/O module 1006a-1006p includes one or more input/output ports 1010a-1010p that are used by network device 1000 to send and receive network packets. Each I/O module 1006a-1006p can also include a packet processor 1012a-1012p. Each packet processor 1012a-1012p can comprise a forwarding hardware component configured to make wire speed decisions on how to handle incoming (ingress) and outgoing (egress) network packets. In some embodiments, the forwarding hardware can comprise an application specific integrated circuit (ASIC), a field programmable array (FPGA), a digital processing unit, or other such collection of configured logic.

Further Embodiments

Embodiments herein include methods implementing an automatic mechanism for defining, distributing, and installing Tunnel Endpoint (TEP) aliases. In some embodiments, the methods comprise receiving, by a first tunnel endpoint over a control plane of a network, a request to provide one or more aliases for communicating over a network tunnel; obtaining, in response to the request, a set of tunnel endpoint (TEP) aliases that include identifiers associated with the first tunnel endpoint; sending, over the control plane, a response addressed to a second tunnel endpoint that includes the set of TEP aliases; and receiving, by the first tunnel endpoint via the network tunnel, network traffic addressed to a TEP alias of the set of TEP aliases.

In some embodiments, the second tunnel endpoint is a headend endpoint and the first tunnel endpoint is a tail-end endpoint. In some embodiments, the network tunnel is a Multiprotocol Label Switching (MPLS) tunnel. In some embodiments, the request includes a PATH message and the response includes a RESV message. In some embodiments, the response includes a Route Record object and an object separate from the Route Record Object, the set of TEP aliases included in the object.

In some embodiments, the method comprises determining an identifier of a device communicatively coupled to the first tunnel endpoint over the network, wherein the set of TEP aliases include the identifier.

In some embodiments, the network traffic includes a first identifier formatted according to a first communication protocol. In some embodiments, the methods further comprise determining, based on the first identifier, a second identifier formatted according to a second communication protocol; and routing the network traffic based on the second identifier.

In some embodiments, the network traffic received is formatted according to a first communication protocol. In some embodiments, the method comprises converting a format of the network traffic according to a second communication protocol.

Some embodiments herein disclose a network device storing program code that, as a result of execution by the network device, causes the network device to receive, via a control plane of a network, a request to provide aliases for communicating over a network tunnel; obtain, in response to the request, a set of tunnel endpoint (TEP) aliases that include identifiers associated with a set of devices connected to the network device; send, over the control plane, a response addressed to a tunnel endpoint and that includes the set of TEP aliases; and receive, via the network tunnel, network traffic addressed to a TEP alias of the set of TEP aliases.

In some embodiments, execution of the program code causes the network device to determine an identifier of a device communicatively coupled to the network device over the network. In some embodiments, the set of TEP aliases include the identifier.

In some embodiments, the response includes a Route Record object and an object separate from the Route Record Object, the set of TEP aliases included in the object. In some embodiments, the network traffic includes a first identifier formatted according to a first communication protocol. In some embodiments, execution of the program code causes the network device to determine, based on the first identifier, a second identifier formatted according to a second communication protocol; and route the network traffic based on the second identifier.

In some embodiments, execution of the program code causes the network device to determine a loopback address of a device communicatively coupled to the network device over the network, wherein the set of TEP aliases include the loopback address. In some embodiments, the network traffic received is formatted according to a first communication protocol. In some embodiments, execution of the program code causes the network device to convert a format of the network traffic according to a second communication protocol.

Embodiments disclosed herein include a method comprising determining that a first tunnel endpoint of a network tunnel is configured to provision a set of TEP aliases; sending, to the first tunnel endpoint over a control plane of a network, a request to provision the set of TEP aliases; receiving, by a second tunnel endpoint over the control plane, a response that includes the set of TEP aliases; storing the set of TEP aliases in memory of the second tunnel endpoint; advertising a TEP alias of the set of TEP aliases on the network; and transmitting, to the first tunnel endpoint over the network tunnel, network traffic addressed to the TEP alias.

In some embodiments, the method comprises receiving the network traffic from a device communicatively coupled to the second tunnel endpoint, the network traffic formatted according to a first communication protocol; and reformatting the network traffic according to a second communication protocol, wherein the network traffic transmitted to the first tunnel endpoint over the network tunnel is formatted according to the second communication protocol.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices may include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C #or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members.

Conjunctive language, such as phrases of the form "at least one of A, B, and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrase "at least one of A, B, and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

The invention claimed is:

1. A method for automatic tunnel endpoint aliasing comprising:
    automatically provisioning a second tunnel endpoint with a plurality of tunnel endpoint (TEP) aliases over a control plane without user input by:
    receiving from the second tunnel endpoint, by a first tunnel endpoint over the control plane of a network, a request including a path message, said request to provide one or more tunnel endpoint aliases for communicating over a network tunnel;
    obtaining by the first tunnel endpoint, in response to the request, the plurality of tunnel endpoint (TEP) aliases that include a plurality of identifiers associated with the first tunnel endpoint;
    sending, over the control plane, a response addressed to the second tunnel endpoint that includes a reservation (RESV) message comprising the plurality of TEP aliases; and
    receiving, by the first tunnel endpoint via the network tunnel between the first tunnel endpoint and the second tunnel endpoint, network traffic addressed to a TEP alias of the plurality of TEP aliases.

2. The method of claim 1, wherein the second tunnel endpoint is a source endpoint and the first tunnel endpoint is a remote endpoint.

3. The method of claim 1, wherein the network tunnel is a Multiprotocol Label Switching (MPLS) tunnel.

4. The method of claim 1, wherein the response includes a Route Record Object and a second object separate from the Route Record Object, the plurality of TEP aliases included in the second object.

5. The method of claim 1, further comprising:
determining an identifier of a network device communicatively coupled to the first tunnel endpoint over the network, wherein the plurality of TEP aliases includes the identifier for the network device.

6. The method of claim 1, wherein the network traffic includes a first identifier formatted according to a first communication protocol, the method further comprising:
determining, based on the first identifier, a second identifier formatted according to a second communication protocol; and
routing the network traffic based on the second identifier.

7. The method of claim 1, wherein the network traffic received is formatted according to a first communication protocol, the method further comprising:
converting a format of the network traffic according to a second communication protocol.

8. A network device storing program code that, as a result of execution by the network device, causes the network device to:
automatically provision a tunnel endpoint with a plurality of tunnel endpoint (TEP) aliases over a control plane without user input by:
receive, via the control plane of a network, a request including a path message, said request to provide the plurality of TEP aliases for communicating over a network tunnel;
obtain, in response to the request, the plurality of tunnel endpoint (TEP) aliases that include a plurality of identifiers associated with each of a set of devices connected to the network device;
send, over the control plane, a response addressed to the tunnel endpoint and that includes a reservation (RESV) message comprising the plurality of TEP aliases; and
receive, via the network tunnel, network traffic addressed to a TEP alias of the plurality of TEP aliases.

9. The network device of claim 8, wherein execution of the program code causes the network device to:
determine an identifier of a device of the set of devices communicatively coupled to the network device over the network, wherein the plurality of TEP aliases include the identifier.

10. The network device of claim 8, wherein the response includes a Route Record Object and a second object separate from the Route Record Object, the plurality of TEP aliases included in the second object.

11. The network device of claim 8, wherein the network traffic includes a first identifier formatted according to a first communication protocol, wherein execution of the program code causes the network device to:
determine, based on the first identifier, a second identifier formatted according to a second communication protocol; and
route the network traffic based on the second identifier.

12. The network device of claim 8, wherein execution of the program code causes the network device to:
determine a loopback address of a device communicatively coupled to the network device over the network, wherein the plurality of TEP aliases includes the loopback address.

13. The network device of claim 8, wherein the network traffic received is formatted according to a first communication protocol, execution of the program code causes the network device to:
convert a format of the network traffic according to a second communication protocol.

14. A method for automatic tunnel endpoint aliasing comprising:
automatically provisioning a second tunnel endpoint with a plurality of tunnel endpoint (TEP) aliases over a control plane without user input by:
determining that a first tunnel endpoint of a network tunnel is configured to provision a plurality of TEP aliases;
sending, to the first tunnel endpoint from the second tunnel endpoint over the control plane of a network, a request including a path message, said request to provision the plurality of TEP aliases;
receiving, by the second tunnel endpoint over the control plane, a response that includes a reservation (RESV) message comprising the plurality of TEP aliases;
storing the plurality of TEP aliases in memory of the second tunnel endpoint;
advertising a TEP alias of the set plurality of TEP aliases on the network; and
transmitting, to the first tunnel endpoint over a data plane of the network, network traffic addressed to the TEP alias.

15. The method of claim 14, wherein the first tunnel endpoint is a terminal endpoint and the second tunnel endpoint is a source endpoint.

16. The method of claim 14, wherein the network tunnel is a Multiprotocol Label Switching (MPLS) tunnel.

17. The method of claim 14, wherein the response includes a Route Record object and a second object separate from the Route Record Object, the plurality of TEP aliases included in the second object.

18. The method of claim 14, further comprising:
receiving the network traffic from a device communicatively coupled to the second tunnel endpoint, the network traffic formatted according to a first communication protocol; and
reformatting the network traffic according to a second communication protocol, wherein the network traffic transmitted to the first tunnel endpoint over the network tunnel is formatted according to the second communication protocol.

19. The method of claim 14, further comprising:
establishing the network tunnel according to a first communication protocol; and
using the plurality of TEP aliases to transmit the network traffic of a second communication protocol over the network.

20. The method of claim 19, wherein the first communication protocol comprises an IPv4 protocol and the second communication protocol comprises an IPv6 protocol; or
wherein the first communication protocol comprises an IPv6 protocol and the second communication protocol comprises an IPv4 protocol.

* * * * *